May 25, 1965 M. A. WILLIAMS 3,185,535

TELEPHONE INSTALLATION

Filed Feb. 5, 1962

INVENTOR
MARION A. WILLIAMS
BY
Lockwood, Woodard, Smith & Weikart
Attorneys

United States Patent Office 3,185,535 Patented May 25, 1965

3,185,535

TELEPHONE INSTALLATION

Marion A. Williams, 5004 Radnor Road, Indianapolis, Ind.

Filed Feb. 5, 1962, Ser. No. 170,900
1 Claim. (Cl. 312—223)

This invention relates generally to telephone installations and more particularly to an installation in a building structure whereby a telephone set is accessible from both sides of a wall of the building structure.

In recent years, it has become the practice to endeavor to provide convenient access to telephones for students living in residence halls of colleges and universities. In some instances it has been felt desirable to have a telephone available to every room in a residence hall wherever possible. Obviously, considerable expense can be involved in so doing.

It is therefore a general object of the present invention to provide means whereby a telephone is immediately available to every room in a building structure and whereby substantial economies can be effected in providing such telephone availability.

It is a further object of the present invention to provide a telephone installation whereby access to a telephone is available from adjacent rooms or suites in a building structure without sacrificing the privacy of the rooms.

Described briefly, the present invention incorporates a cabinet in a wall of a building structure, which wall separates adjacent living rooms. The cabinet is provided with a door on each side of the wall and has a telephone set pivotally mounted within the cabinet. Thus, the resident of one room at one side of the wall can open the door of the cabinet on his side of the wall and use the telephone, without at the same time disturbing the resident of the adjacent room. When desired, the resident of the adjacent room may open his door to the cabinet structure and use the telephone set therein.

The full nature of the invention will be understood from the accompanying drawings and the following description and the claim.

Figure 1:
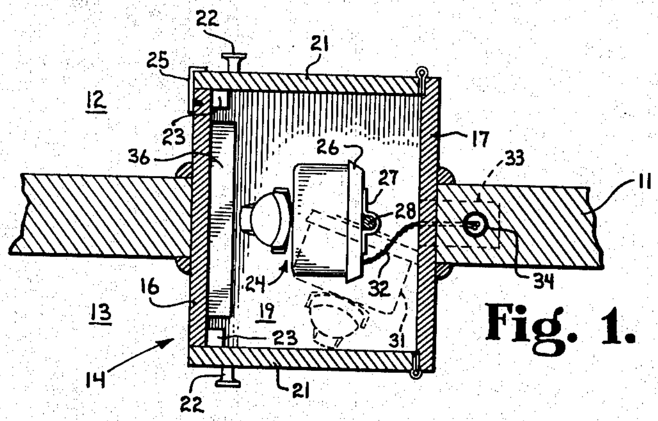
FIG. 1 is a sectional plan view of a vertical building wall with the telephone installation provided therein according to the present invention.

Referring to the drawing, a vertical building wall 11 separates rooms 12 and 13 of a building. The entire rooms 12 and 13 are, of course, not shown. A cabinet 14 is disposed in the opening provided therefor in the wall 11 and includes the opposite sides 16 and 17, the ceiling 18, and the floor 19. There is also included in the cabinet a door 21 at each side of the wall 11 providing access to the interior of the cabinet from each of the rooms 12 and 13 by merely opening its respective door. An appropriate knob 22 is provided on the door and a magnetic latch 23 secures the door in the closed position. If additional privacy is desired, a suitable lock which may be as simple as the clip 25 for example, can be provided on the door.

A telephone set 24 is mounted inside the cabinet. A useful mounting detail provides a board 26 secured by suitable fasteners 27 to a vertically standing rod 28. The rod 28 is normally pivotally mounted in appropriate metal inserts 29 secured into the floor and ceiling of the cabinet. In this manner the telephone set can be swung to the position designated by the dotted outline 31 in FIG. 1, generally facing the door which opens into room 13. Therefore the telephone is readily accessible to the room 13. Likewise, the telephone may be swung to a position generally facing the door opening into room 12 to provide access thereto from that room.

The telephone cord 32 may be passed through the box 33 into the conduit 34.

Brackets 36 and 37 are mounted to the wall 16 to provide a convenient storage place for the telephone directory 38.

Figures 2, 3, 4:
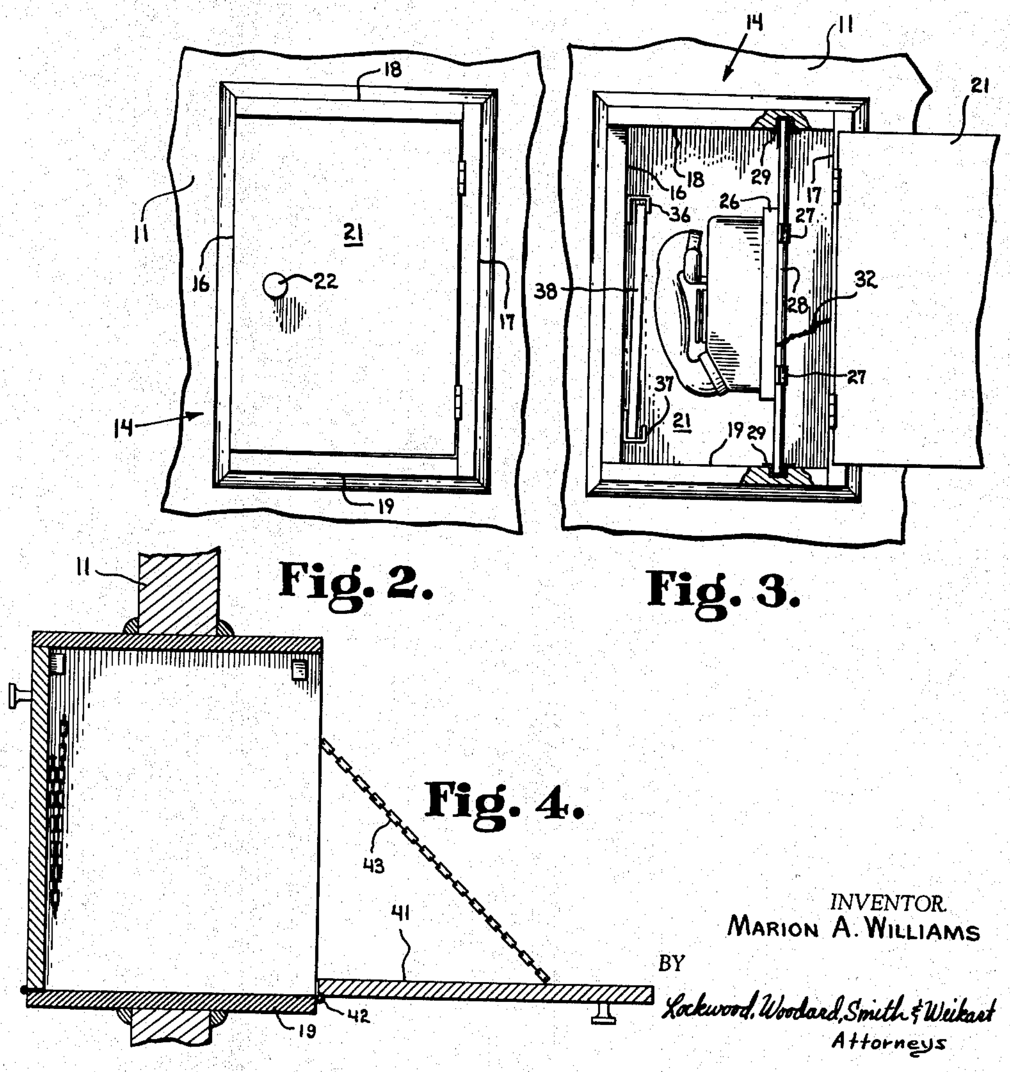
FIG. 2 is an elevation view of the installation of the present invention, only a fragment of the wall being shown to conserve drawing space.
FIG. 3 is a view similar to FIG. 2 with the door of the installation opened to illustrate certain interior details.
FIG. 4 is a fragmentary elevation view looking parallel to the building wall and illustrating an alternative cabinet door mounting to provide a writing table.

In FIG. 4 the door 41 (shown in the open condition) is mounted by hinges 42 on its lower edge to the floor 19 of the cabinet, and is supported in place as shown by chains 43 secured to the sides of the cabinet. It thereby provides a convenient writing table when opened, as well as providing access to the telephone set.

It will be appreciated from the above description, that a telephone can be provided for every room in a residence hall according to the present invention and yet effect a very substantial cost saving by comparison with the cost of the usual installation of an individual telephone set in every room. Yet any degree of privacy desired can be achieved by the simple expedient of a lock on the door of the cabinet.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claim.

The invention claimed is:

In a building structure, the combination comprising:

a vertical wall with an opening therein;

a cabinet in said opening, said cabinet having opposed wall and floor and ceiling members located to completely fill said opening;

a door in said cabinet at each side of said wall to provide access from both sides of said wall to the interior of said cabinet;

a vertically standing rod pivotally mounted in the ceiling and floor members of the interior of said cabinet;

and a telephone set in said cabinet and mounted to said rod whereby it is accessible from both sides of said wall and swingable to generally face both of said doors alternately;

and a cord for said telephone set leading from said telephone set through one of said cabinet members into said wall whereby said cabinet doors may be closed without interference of said cord.

References Cited by the Examiner

UNITED STATES PATENTS

| | | | |
|---|---|---|---|
| 477,968 | 6/92 | Stevenson | 211—96 |
| 566,010 | 8/96 | Norkus | 312—286 X |
| 1,175,947 | 3/16 | Frederickson | 232—1.6 |
| 1,780,353 | 11/30 | Jones | 312—287 X |
| 2,819,140 | 1/58 | Berg | 312—242 |
| 2,982,593 | 5/61 | Chambers | 312—223 |

OTHER REFERENCES

"Modern Furniture," by Mario Dal Fabbro, published by Reinhold Publishing Co., New York, 1949 (top p. 92 relied on, Rotatable Telephone Support Mounted in Wall).

FRANK B. SHERRY, *Primary Examiner.*